(12) United States Patent
Cho

(10) Patent No.: US 6,940,260 B2
(45) Date of Patent: Sep. 6, 2005

(54) MICROENERGY DEVICE FOR PRODUCING MECHANICALLY MODULATED MICROENERGY OUTPUT FROM DIGITAL MICROENERGY INPUT

(75) Inventor: Young-Ho Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 140 days.

(21) Appl. No.: 10/645,985

(22) Filed: Aug. 22, 2003

(65) Prior Publication Data

US 2004/0036455 A1 Feb. 26, 2004

(30) Foreign Application Priority Data

Aug. 22, 2002 (KR) .............................. 10-2002-0049747

(51) Int. Cl.[7] .................................................. G05F 1/40
(52) U.S. Cl. ....................................................... 323/266
(58) Field of Search ................................. 323/266, 268, 323/364; 361/225, 230, 231, 235

(56) References Cited

U.S. PATENT DOCUMENTS 6,477,028 B1 * 11/2002 Pinto ........................... 361/233
6,624,377 B2 * 9/2003 Gianchandani et al. ..... 219/69.13
6,842,326 B2 * 1/2005 Pinto ........................... 361/233

OTHER PUBLICATIONS

"Electrostatically Actuated Gas Microvalve Based on a TA–SI–N Membrane" Ph. Dubois et al., MEMS 2001, The 14th IEEE International Conference on 2001, pp. 535–538.
"An SOI Optical Microswitch Integrated with Silicon Waveguides and Touch–down Micromirror Actuators" Young–Hym Jin et al., Proc. 3rd International Conference Optical MEMS 2000 (MOEMS 2000) Kauai, U.S.A. (Aug. 21–24, 2000), pp. 43–44.

* cited by examiner

Primary Examiner—Matthew V. Nguyen
(74) Attorney, Agent, or Firm—Graybeal Jackson Haley LLP

(57) ABSTRACT

The present invention relates to a microenergy device for generating highly precise microenergy required for future high performance complex information appliances. The microenergy device of the present invention comprises a microenergy generating unit and a micromechanical modulating unit. The microenergy generating unit includes at least one digital microenergy generator which operates in response to a digital signal to be inputted into the generator. The micromechanical modulating unit performs mechanical modulation of an output of the microenergy generating unit and finally outputs the modulated microenergy.

18 Claims, 6 Drawing Sheets

MICROENERGY DEVICE FOR PRODUCING MECHANICALLY MODULATED MICROENERGY OUTPUT FROM DIGITAL MICROENERGY INPUT

CROSS-REFERENCE TO RELATED APPLICATIONS

The present application claims priority from Korean patent application No. 2002-49747, filed 22 Aug. 2002, which is incorporated by reference.

BACKGROUND OF THE INVENTION

1. Field of the Invention

The present invention relates to a micro electro mechanical system (MEMS), and more particularly, to a microenergy device capable of generating extremely precise micro energy which is the most significant characteristic required in the microenergy device.

2. Description of the Prior Art

In general, a microenergy device refers to a device for outputting the finely adjustable microenergy. The microenergy may include force, displacement, velocity, momentum, pressure, flow rate, flow velocity, temperature, heat flux, heat flow, reaction energy, etc.

According to a principle of outputting the microenergy, such a microenergy device can be classified into a piezo-electric microenergy device, an electrostatic microenergy device, electromagnetic microenergy device, and thermal expansion microenergy device, for example.

Accordingly, an MEMS field is also classified, according to a type of the microenergy to be employed, into Bio-MEMS, Power-MEMS, Micro-fluidics, RF-MEMS, Optical-MEMS and the like. Therefore, the microenergy device serves as a microactuator, a micropump and a micro-mirror in the fields of the Power-MEMS, the Micro-fluidics and the Optical-MEMS, respectively.

Technologies for the microenergy devices can be known in the following published documents:

"Electrostatically actuated gas microvalve based on a Ta—Si—N membrane", Ph. Dubois, B. Guldimann, M.-A. Gretillat, N. F. de Rooij, Micro Electro Mechanical Systems, 2001, MEMS 2001, The 14$^{th}$ IEEE International Conference on 2001, pp. 535–538; and "An SOI optical microswitch integrated with silicon waveguides and touch-down micromirror actuators", Y. H. Jin, K. S. Seo, Y. H. Cho, S. S. Lee, K. C. Song, J. U. Bu, Proc. 3$^{rd}$ International Conference Optical MEMS 2000 (MOEMS 2000), Kauai, U.S.A. (Aug. 21–24, 2000), pp. 43–44.

As shown in FIG. 1, the conventional microenergy device is composed of an electrical modulator 1 and an analog microenergy generator 2.

The electrical modulator 1 has a function of generating electrical energy corresponding to a control signal inputted thereto and transmitting the generated electrical energy to the analog microenergy machine 2. The analog microenergy generator 2 has a function of outputting microenergy corresponding to the electrical energy inputted from the electrical modulator 1.

The conventional microenergy device is constructed in such a manner that the electrical modulator 1 which has received the input signal supplied from the outside in the form of a digital signal modulates the electrical energy supplied to the analog microenergy generator 2 according to the input signal and the analog microenergy generator 2 generates the microenergy corresponding to an amount of change in the electrical energy inputted from the electrical modulator 1.

However, there are the following three problems in obtaining the highly precise microenergy using a conventional method of operating the microenergy device.

A first one of the problems is that a magnitude of the microenergy is influenced by an error included in the electrical signal.

As an example, a case where the microenergy to be processed is actuation displacement will be discussed. In general, a lower threshold of the noise contained in the electrical signal of 10 V is 1 to 10 mV. However, a voltage should be adjusted to a degree of 10 $\mu$V in order to control the actuation displacement having a range of 1 mm and a precision of 1 nm using the electrical signal of 10 V. Thus, it cannot be achieved by a current technology.

Another problem is that a current MEMS device fabricated based on the UV has a fabrication tolerance of 0.1 to 0.5 $\mu$m. The fabrication tolerance can make it difficult to precisely adjust the microenergy.

A last problem is related to uncertainty in physical properties of materials which construct the MEMS device.

The materials which construct the MEMS device are generally formed through a thin film process. Thus, since the properties of the materials are changed depending upon the performed process and process conditions thereof, they can have an influence on the adjustment of the microenergy.

SUMMARY OF THE INVENTION

Accordingly, the present invention is conceived to solve the problems in the prior art. An object of the present invention is to provide a microenergy device capable of repeatedly generating highly precise microenergy which cannot be obtained from the conventional microenergy device.

According to an aspect of the present invention for achieving the aforementioned object, there is provided a microenergy device which comprises a microenergy generating unit and a micromechanical modulating unit for mechanically modulating the microenergy generated from the microenergy generating unit and outputting the modulated microenergy. The microenergy generating unit includes one or more unit digital microenergy generator constructed such that any one of two different levels of microenergy, which are always kept constant, can be selectively generated.

BRIEF DESCRIPTION OF THE DRAWINGS

The above and other objects, advantages and features of the present invention will become apparent from the following description of preferred embodiments given in conjunction with the accompanying drawings, in which.

DETAILED DESCRIPTION OF THE INVENTION

Hereinafter, a microenergy device and a microenergy system thereof according to preferred embodiments of the present invention will be explained with reference to the accompanying drawings.

Figure 1:
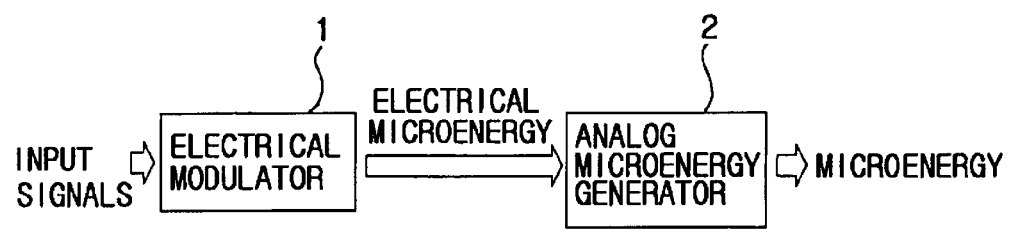
FIG. 1 is a view schematically showing the constitution of a conventional microenergy device.
Figure 2:
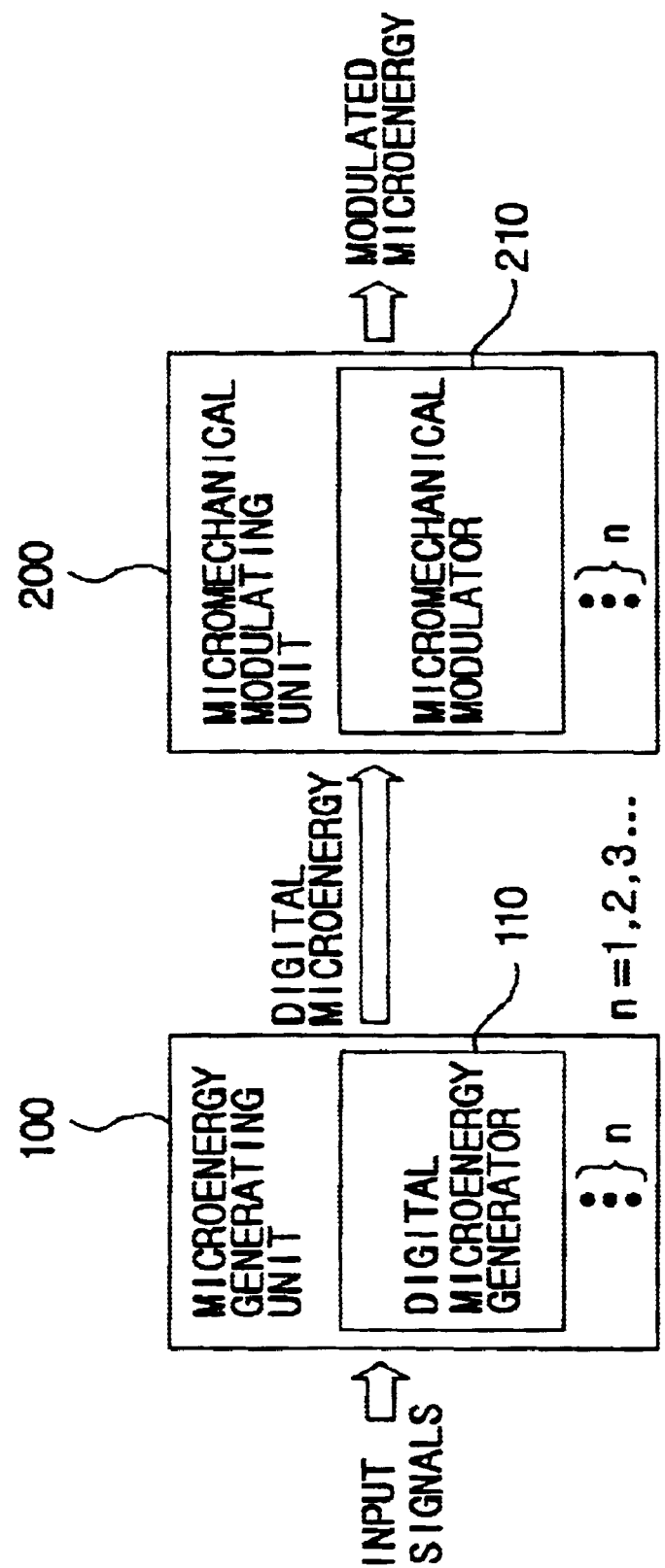
FIG. 2 is a block diagram showing the constitution of a microenergy device according to a first embodiment of the present invention.

FIG. 2 is a block diagram showing the constitution of the microenergy device according to a first embodiment of the present invention. As shown in the figure, the microenergy device of the present invention comprises a microenergy generating unit 100 and a micromechanical modulating unit 200.

The microenergy device comprising the microenergy generating unit 100 and the micromechanical modulating unit 200 should finally output desired microenergy. To this end, a digital signal used to generate the desired microenergy from the device should be supplied to the microenergy device of the present invention.

According to the above prerequisite, the microenergy generating unit 100 operates in response to the digital signal inputted from the outside, and thus, generates the microenergy.

At this time, the microenergy generating unit 100 comprises one or more digital microenergy generators 110 each of which operates in response to the digital signal (i.e., actuation signal) inputted from the outside and thus generates a predetermined constant unit microenergy.

Therefore, when the digital signal is applied to a plurality of the digital microenergy generator 110, any one of them corresponding to the applied digital signal will be actuated.

Now, an operating principle of the digital microenergy generator 110 will be explained.

The digital microenergy generator 110 operates based on any one of principles such as an electrostatic phenomenon, a piezoelectric phenomenon, an electromagnetic phenomenon, a thermal expansion phenomenon, and a phase change phenomenon, and the like. Depending on the operating principles, the digital microenergy generator is classified into an electrostatic microenergy generator, an electromagnetic microenergy generator, a piezoelectric microenergy generator, a thermal expansion type microenergy generator, a phase change type microenergy generator, etc.

Translating literally, the electrostatic microenergy generator is the microenergy generator using static electricity. That is, the electrostatic microenergy generator operates based on the principle that when charges of opposite polarities are collected in two electrodes, a force for attracting the charges to one another is produced. In case of the piezoelectric microenergy generator, a piezoelectric material in which strain is produced when an electric field is applied thereto is used. Further, the electromagnetic microenergy generator is based on the Lorentz force, and uses a method of generating the microenergy by arranging conductors, through which current can flow, around desired positions so as to generate the magnetic field thereabout.

Furthermore, the thermal expansion type microenergy generator is a kind of bimetal switch in which a phenomenon that a material expands due to thermal energy generated by electric heating is used. At this time, the material used in the thermal expansion type microenergy generator may be either a solid material or a fluid (gas or liquid). The phase change type microenergy generator is based on a volume change of the material produced when the phase change thereof occurs, as in an ink jet printer from which ink is discharged.

Those skilled in the art can easily fabricate the unit digital microenergy generator 110 using the aforementioned principles. However, for the easy understanding thereof, an example of fabricating the digital electrostatic microenergy generator based on the electrostatic principle will be hereinafter described.

The digital electrostatic microenergy generator is installed such that two conductor plates face each other. That is, one of the conductor plates is fixed to a floor, while another is supported by a spring to be placed in the air. The conductor plate fixed to the floor is called a fixed plate, and the conductor plate placed in the air is called a movable plate. Then, the input signal causes a potential to be generated between the two conductor plates. Thus, the movable plate is moved by means of the electrostatic force, and the movement of the movable plate becomes the microenergy. Here, in the digital microenergy generator, a range of movement of the movable plate is restricted so that only a predetermined magnitude of the microenergy can be generated regardless of the magnitude of the input signal. That is, the digital microenergy can be generated by installing walls for restricting the movement of the movable plate at the front and rear of the movable plate in its moving direction so that the movable plate can be moved within a range limited by the installed walls, regardless of the magnitude of the input signal.

The microenergy generated from the microenergy generating unit 100 is transferred to the micromechanical modulating unit 200.

The micromechanical modulating unit 200 performs a function of mechanically modulating the digital microenergy received from the one or the plurality of digital microenergy generators 110 and finally outputting the modulated microenergy.

Here, the mechanical modulation is called any one of actions such as intermittence, amplification, attenuation, filtering, digital/analog conversion, analog/digital conversion, rectification, and the like.

The intermittence is to output either all the microenergy inputted from the digital microenergy generator 110 or nothing of the energy. The amplification is to output the output microenergy that has been amplified by predetermined times the magnitude of the input microenergy. The attenuation is to output the output microenergy that has been reduced by predetermined times the magnitude of the input microenergy. The filtering is to output the output microenergy from which errors or unnecessary components contained in the input microenergy have been filtered out. The digital/analog conversion and analog/digital conversion are to output analog microenergy converted from the inputted digital microenergy and to output digital microenergy converted from the inputted analog microenergy, respectively. Finally, the rectification is to regulate a flowing direction of the microenergy so that the microenergy flows in only one direction.

Herein, the modulation functions performed in the micromechanical modulating unit 200 are carried out in a linear mode that a ratio of the output microenergy to the input microenergy is always kept constant or in a nonlinear mode that the ratio of the output microenergy to the input microenergy may vary according to the magnitude of the input microenergy.

Furthermore, the micromechanical modulating unit 200 is composed of a micro structure, a micro mechanism, a micro fluid element, a micro thermal element, a micro-chemical element, and the like. The components of the micromechanical modulating unit 200 can be varied according to kinds of the microenergy to be modulated in the mechanical modulator, and can be mainly classified as follows.

In a case where the mechanical modulator performs the modulation of the micromechanical energy such as force, displacement, velocity and momentum, the mechanical modulator will be composed of the microstructure and micromechanism such as spring, lever and gear.

In a case where the mechanical modulator performs the modulation of the micro fluid energy such as pressure, flow rate and flow velocity, the mechanical modulator will be composed of the micro fluid elements such as flow resistor and micro channel.

In a case where the mechanical modulator performs the modulation of the micro thermal energy such as temperature, heat and heat flux, the mechanical modulator will be composed of the micro-heating elements such as heat pipe and heat resistor.

In a case where the mechanical modulator performs the modulation of the micro chemical energy such as reaction energy, the mechanical modulator will be composed of the micro-chemical element such as reactor.

In addition, the micromechanical modulating unit 200 can perform a function of converting a kind of micro energy, e.g. the micromechanical energy, into another kind of microenergy, e.g. the micro fluid energy, and modulating the converted microenergy. In such a case, the micromechanical modulating unit is composed of the microelements related to both the two kinds of microenergy.

As described above, the digital microenergy generator 110 of the present invention can generate the predetermined constant output or microenergy regardless of the magnitude of the input signal, and the micromechanical modulator can modulate the generated output or microenergy without any influence of the electrical signal. Thus, the final output of the microenergy device is not influenced by the electrical signal.

Accordingly, the final output of the microenergy device according to the preferred embodiment of the present invention is influenced by only mechanical noise rather than electrical noise. This known fact is illustrated in FIG. 3.

Figure 3:
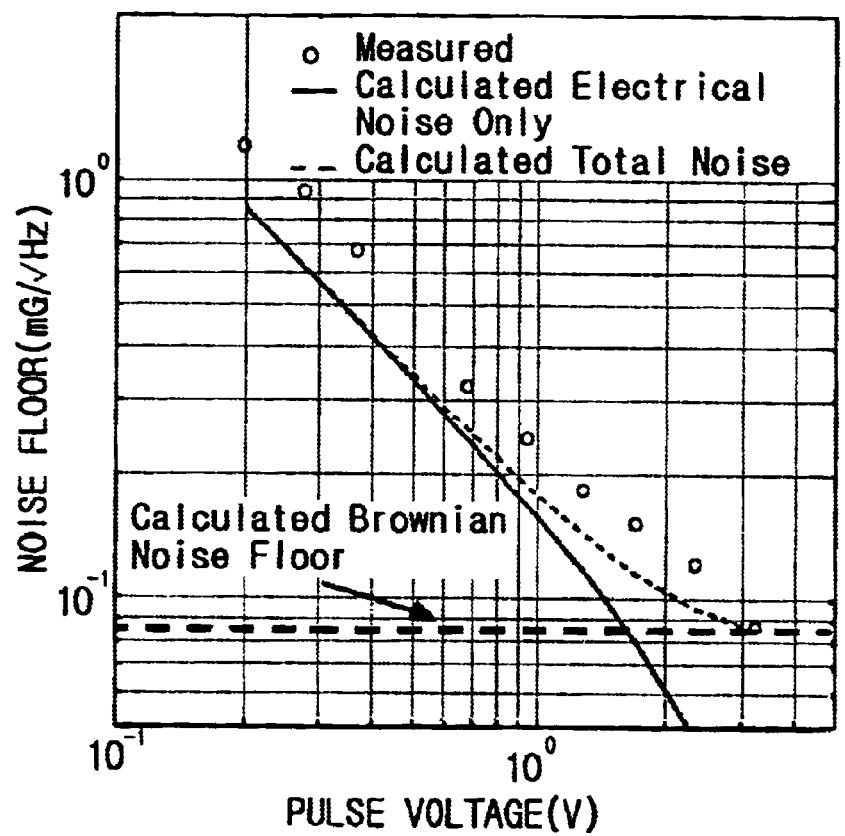
FIG. 3 is a graph showing that a mechanical noise margin is lower than an electrical noise margin in a micro region.

FIG. 3 is a graph showing that a mechanical noise margin is lower than an electrical noise margin in a micro region: As shown in the figure, the electrical signal contains a Brownian noise floor. The Brownian noise floor is signal noise inherent to all the devices for generating the electrical signal. Therefore, the electrical signal further contains the Brownian noise, in addition to the noise resulting from the electrical signal itself. However, since the mechanical devices do not generate the electrical signal and thus include only the Brownian noise, they have lower noise than the electrical devices.

Based on the above fact, it is well known that the noise of the mechanical signal is lower than that of the electrical signal in the micro region.

Accordingly, the microenergy device for performing the mechanical modulation according to the present invention can generate the highly precise microenergy, contrary to the conventional microenergy device.

Hereinafter, the microenergy device according to a preferred embodiment of the present invention shown in FIG. 2 will be specifically explained with reference to FIG. 4.

Figure 4:
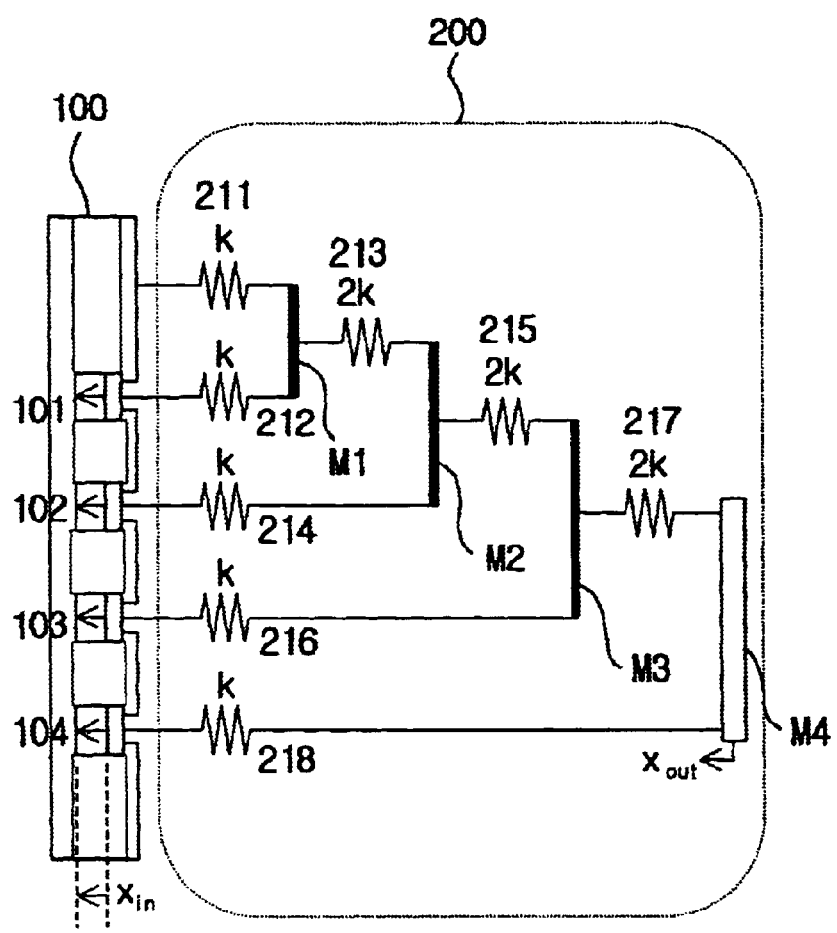
FIG. 4 is an exemplary view of the microenergy device for finally outputting a displacement as a kind of micro mechanical energy according to the first embodiment of the present invention.

FIG. 4 shows a detailed configuration of the microenergy generating unit 100 and the micromechanical modulating unit 200 which have been shown in FIG. 2.

The microenergy generating unit 100 according to the preferred embodiment comprises four unit digital microenergy machines 110, 102, 103 and 104.

Each of the digital microenergy generators 110 to 104 includes a displacement body which takes only one of a first position where actuation displacement is zero and a second position where actuation displacement is $X_{in}$, in response to the digital control signal. Energy for moving the displacement body is supplied from an energy source of FIG. 3, but the amount of displacement of the displacement body is not influenced even though the magnitude of the input energy is changed. That is, the displacement body is constructed such that it can take any one of the first and second positions according to a value of the digital input signal even though the magnitude of the input energy is changed.

The reason that the electrical energy is preferred as the energy source is that the magnitude of the input energy thereof can be easily controlled as compared with the other energy sources. However, the other energy sources as well as the electrical energy can also be utilized in the present invention, since it is not necessary to precisely control the magnitude of the input energy.

As a material for use in the digital microenergy generators 110 to 104, a piezoelectric material, an electrostatic material, an electromagnetic sensitive material, or a thermal expansion material, or the like can also be preferably utilized. Further, the other materials may also be properly utilized depending on the kinds of the energy source.

The micromechanical modulating unit 200 according to the preferred embodiment of the present invention is a mechanism into which eight springs and four masses are combined.

In the mechanism, first and second springs 211, 212 have identical stiffness of k and arranged in parallel with each other. A first mass M1 is attached to distal ends of the springs 211, 212. A portion into which the first and second springs 211, 212 and the first mass M1 are combined is called a first partial mechanism. In the first partial mechanism, the first mass M1 exhibits the same elastic behavior as a mass supported by one spring having the stiffness of 2 k.

A third spring 213 is arranged in series with the first and second springs 211, 212 with the first mass M1 interposed therebetween. A fourth spring 214 is arranged in parallel with the first to third springs 211 to 213, and a second mass M2 is attached to distal ends of the third and fourth springs 213, 214. A portion into which the first to fourth springs 211 to 214 and the first and second masses M1, M2 are combined is called a second partial mechanism. In the second partial mechanism, a calculated value of the stiffness of a combination of the first to third springs 211 to 213 is k. Thus, the second mass M2 exhibits the same elastic behavior as a mass supported either by a pair of springs which are arranged in parallel with each other and have stiffness of k or by one spring having stiffness of 2 k.

A fifth spring 215 is arranged in series with the first to fourth springs 211 to 214 with the second mass M2 interposed therebetween. A sixth spring 216 is arranged in parallel with the first to fifth springs 211 to 215, and a third mass M3 is attached to distal ends of the fifth and sixth spring 215, 216. A portion into which the first to sixth springs 211 to 216 and the first and third masses M1 to M3 are combined is called a third partial mechanism. In the third partial mechanism, a calculated value of the stiffness of the combination of the first to fifth springs 211 to 215 is k. Thus, the third mass M3 exhibits the same elastic behavior as the mass supported either by a pair of springs which are arranged in parallel with each other and have stiffness of k or by one spring having stiffness of 2 k.

A seventh spring 217 is arranged in series with the first to sixth springs 211 to 216 with the third mass M3 interposed therebetween. A eighth spring 218 is arranged in parallel with the first to seventh springs 211 to 217, and a fourth mass M4 is attached to distal ends of the seventh and eighth spring 217, 218. The first to eighth springs 211 to 218 and the first and fourth masses M1 to M4 construct a whole mechanism. In the whole mechanism, a calculated value of the stiffness of the combination of the first to seventh springs 211 to 217 is k. Thus, the fourth mass M4 exhibits the same elastic behavior as the mass supported either by a pair of springs which are arranged in parallel with each other and have stiffness of k or by one spring having stiffness of 2 k.

A proximal end of the micromechanical modulating unit 200 constructed by such a spring mechanism becomes an input section to which the microenergy generated from the microenergy generating unit 100 is applied, whereas the first and fourth masses M1 to M4 form an output station from which the modulated microenergy is outputted.

A proximal end of the first spring 211 of the micromechanical modulating unit 200 according to the preferred embodiment of the present invention is fixed. Further, proximal ends of the second, fourth, sixth and eighth springs 212, 214, 216 and 218 are connected to the first, second, third and fourth digital microenergy generators 110, 102, 103 and 104 of the microenergy generating unit 100, respectively.

Hereinafter, the operation of the microenergy device according to the embodiment of the present invention will be described.

First, assume that in FIG. 4, a state where the respective digital microenergy generators 110 to 104 are moved to the right is called actuation displacement 0 and a state where they are moved to the left is referred to as the actuation displacement $X_{in}$.

A case where the fourth digital microenergy generator 104 is to move to a position corresponding to the actuation displacement $X_{in}$ will be first discussed. As described above, since the stiffness of the third partial mechanism shown in FIG. 4, i.e. the combination of the first to seventh springs 211 to 217, is k, the fourth mass M4 exhibits the same elastic behavior as a mass supported by a pair of springs having stiffness of k. Therefore, if the proximal end of the eighth spring 218 is moved by $X_{in}$, the output actuation displacement $X_{out}$, becomes a half of the input actuation displacement $X_{in}$.

Figure 5:
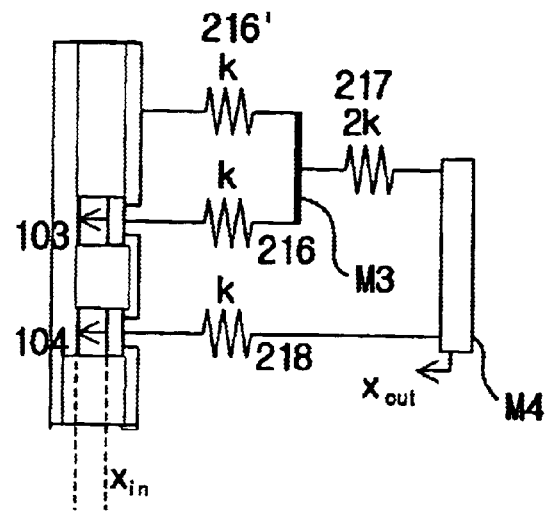
FIG. 5 is an exemplary view of the microenergy device modeled when one digital unit microenergy machine is operated in the microenergy device of FIG. 4.

Secondly, a case where the third digital microenergy generator 103 is to move to the position corresponding to the actuation displacement $X_{in}$ will be discussed. As described above, the stiffness of the second partial mechanism shown in FIG. 4, i.e. the combination of the first to fifth springs 211 to 215, is k. If the second partial mechanism is replaced with the spring 216' having stiffness of k in FIG. 4, the microenergy device can be represented in a simpler manner as shown in FIG. 5. The stiffness of the spring mechanism related to the fourth mass M4 in FIG. 5 will be calculated below. Since the seventh spring 217 and the eighth spring 218 are arranged in series with each other, stiffness of the combination is two thirds of k (i.e., 2 k/3). Further, when focusing on the third mass M3, the combination has a spring force which acts in parallel with the sixth spring 216 and the spring 216' substituting for the aforementioned second partial mechanism, the third mass M3 exhibits the same elastic behavior as a mass supported by a pair of springs having stiffness of k and one spring having stiffness of 2 k/3, or by one spring having stiffness of 8 k/3. Therefore, if the proximal end of the sixth spring 216 is moved by $X_{in}$, the output actuation displacement $X_{out}$ of the third mass M3 becomes three eighths of the input actuation displacement.

In such a way, it can be easily calculated that if the second digital microenergy generator 102 is moved by the actuation displacement $X_{in}$, the output actuation displacement $X_{out}$ of the second mass M2 becomes one eighth of the input actuation displacement $X_{in}$, whereas if the first digital microenergy generator 110 is moved by the actuation displacement $X_{in}$, the output actuation displacement $X_{out}$ of the second mass M2 becomes one sixteenth of the input actuation displacement $X_{in}$.

Moreover, an output produced when a plurality of digital microenergy generators simultaneously operate will be discussed below. Since the respective springs have linear characteristics, the stiffness is not changed even when the plurality of digital microenergy generators operate simultaneously. This means that even though the plurality of digital microenergy generators operate simultaneously, an modulated output caused by one digital microenergy generator is identical.

Thus, the output actuation displacement obtained at this time is represented as a sum of the respective output actuation displacements obtained when each of the digital microenergy generators operates independently. That is, the output actuation displacement obtained when the first, third and fourth digital microenergy generators 110, 103 and 104 operate becomes ($\frac{1}{2}+\frac{1}{4}+\frac{1}{16}$) times as large as the input actuation displacement $X_{in}$, and the output actuation displacement obtained when the second and third digital microenergy generators 102, 103 simultaneously operate becomes ($\frac{1}{4}+\frac{1}{8}$) times as large as the input actuation displacement $X_{in}$.

Therefore, according to the present embodiment, 16-stage actuation displacements from 0 to ($\frac{15}{16}$)$X_{in}$ can be outputted at an identical interval of ($\frac{1}{16}$)$X_{in}$ depending on the operations of the digital microenergy generators.

Further, resolution of the embodiment can be increased exponentially by increasing the number of the digital microenergy generators and the number of input terminals of the micromechanical modulator.

The embodiment operating in such a manner can perform the actuation with a higher accuracy since there is little variation in a final output due to the following causes.

First, the final output is not changed even though an error is included in input energy. In the embodiment, since initial actuation is performed by using the digital microenergy generators and then mechanically modulated and outputted, the outputted microenergy is influenced only by on-off switching operations of digital input signals and there is no variation in the output due to the error included in the input energy.

Second, even though there are errors in fabricating processes and physical properties upon fabrication of the microenergy device, great variation in the final output does not occur. In view of characteristics of the fabricating processes of the microenergy devices, the errors in the fabricating processes and physical properties of respective fabricated microenergy devices are very large and are produced differently from one another. However, the errors in the fabricating processes and physical properties of one microenergy device are very large but produced consistently. That is, since the micromechanical modulating unit of the embodiment is implemented by one kind of spring having an identical shape and dimension, a change in the stiffness of the spring due to the errors in the fabricating processes and physical properties occurs at an identical rate within one device. Moreover, since the actuation displacement in the embodiment is modulated according to a stiffness ratio (corresponding to a dimension or physical property ratio) regardless of an absolute magnitude of the stiffness of each spring, the variation in the final output is not produced even though the change in the fabricating processes and physical properties occurs.

Hereinafter, a microenergy device for outputting a flow rate as a final output will be described with reference to FIG. 6.

Figure 6:
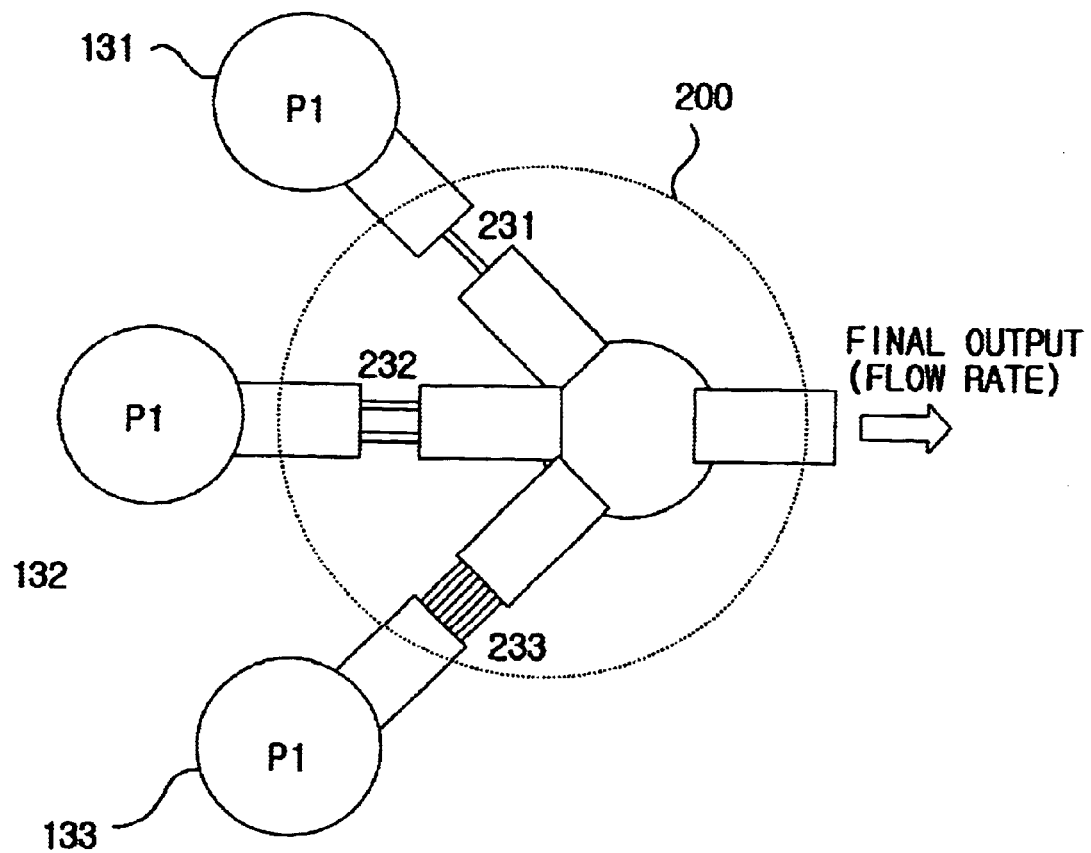
FIG. 6 is another exemplary view of a microenergy device according to a second embodiment of the present invention.

FIG. 6 is a view of a microenergy device according to another embodiment of the present invention. As shown in FIG. 6, the microenergy device according to the embodiment of the present invention comprises the microenergy generating unit 100 including digital microenergy generators 131 to 133 for generating predetermined unit pressure, and the micromechanical modulating unit 200 for receiving and mechanically modulating the pressure that is an output of each of the digital microenergy generators and finally outputting the modulated pressure.

Here, the digital microenergy generators of the embodiment operate in a digital manner by which they output only pressure of 0 or P1. It can be simply implemented by means of a static pressure generating device, an on/off valve and the like. Further, since all the digital microenergy generators output the identical actuation output P1, the present embodiment can be implemented by an identical kind of digital microenergy generators having an identical dimension.

At this time, the micromechanical modulating unit 200 includes a plurality of flow resistors 231 to 233 and a plurality of flow passages, and mechanically modulates the inputted pressure and finally outputs the flow rate. Here, the flow resistor means a flow passage having a reduced width much smaller than that of the flow passage for use in the microenergy device. When a fluid flows through the reduced passage constructed as such, a large portion of the pressure is applied to both ends of the flow resistor.

Moreover, the flow resistors used herein are one kind of flow resistors (having identical shape and dimension), and the micromechanical modulating unit can be implemented by connecting one kind of flow resistors in series or parallel in order to implement flow resistors having twofold, quadruple, octuple or more flow resistance.

Next, the operation of the embodiment of the present invention will be described with reference to FIG. 6.

First, assume that pressure at an output terminal of the embodiment is 0, and that each of the unit digital microenergy machines outputs the pressure of P1 and 0 when it operates and dose not operate, respectively.

A case where one of the unit digital microenergy machines 131 operates will be discussed.

If the differential pressure of P1 is applied to both ends of the flow resistor 231 having a resistance value of Rf, a flow rate therethrough is P1/Rf. Thus, the magnitude of a finally outputted flow rate becomes P1/Rf. Since this relationship is identically applied to even when one of the other digital microenergy generators operates, the finally outputted flow rate is 2P1/Rf and 4P1/Rf in cases where the digital microenergy generators 132 and 133 operate, respectively. Further, since all of flow rates from the flow passages connected to the digital microenergy generators 131 to 133 are summed and the summed flow rate is finally outputted, for example, the finally outputted flow rate is (4+1)P1/Rf in a case where the digital microenergy generators 131, 133 operate, and (2+1)P1/Rf in a case where the digital microenergy generators 131, 132 operate.

In the present embodiment, eight flow rates from 0 to 7P1/Rf can be outputted at an interval of P1/Rf depending on the operations of the digital microenergy generators.

Further, resolution of the embodiment can be increased exponentially by increasing the number of the digital microenergy generators and the number of input terminals of the micromechanical modulating unit.

In the present embodiment operating as such, since there is little variation in the final output due to errors included in input signals, the errors in the fabricating processes, the errors in the physical properties and the like, the actuation can be made with higher accuracy. This is identical with that of the embodiment of the microenergy device for finally outputting the actuation displacement.

The microenergy device can be designed as a composite type or a multi-stage type by combining the digital microenergy generators and the micromechanical modulating unit in series or parallel so as to adjust the characteristics of the final output such as a range, velocity and force.

Since the characteristics such as the range, velocity and force which the respective digital microenergy generators can output depending on operating manners and actuating principles thereof are changed, microenergy devices requiring various characteristics can be fabricated by selecting operating manners and modulating principles suitable for the required characteristics.

Furthermore, by combining the digital microenergy generators and the micromechanical modulators, it is possible to fabricate a microenergy device capable of performing multi-degree-of-freedom actuation.

Hereinafter, a microenergy device according to a third embodiment of the present invention will be described with reference to FIG. 7.

Figure 7:
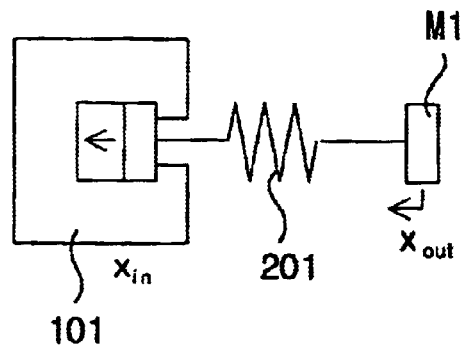
FIG. 7 is a further exemplary view of a microenergy device according to a third embodiment of the present invention.

FIG. 7 is a view of the microenergy device according to the third embodiment of the present invention, wherein the combination of the digital microenergy generators in series or parallel is actuated with digital signals having different frequency and time characteristics so as to adjust the characteristics of the final output such as the range, velocity and force.

The microenergy device according to the embodiment of the present invention shown in FIG. 7 is a microenergy device for finally outputting displacement, which comprises one digital microenergy generator 110 for generating predetermined unit displacement, and the micromechanical modulating unit 200 of the spring mechanism consisting of one spring 201 and one mass M1.

Figure 8:
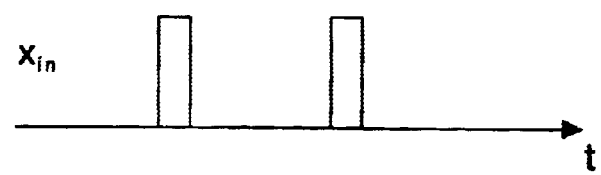
FIG. 8 is a graph showing waveforms of an input and a final output in a case where two digital inputs are applied to the microenergy device of FIG. 7 at a sufficiently long time interval.

If two digital actuation signals are supplied thereto at a sufficient time interval therebetween, two separate final outputs (actuation displacement) are obtained as shown in FIG. 8.

Figure 9:
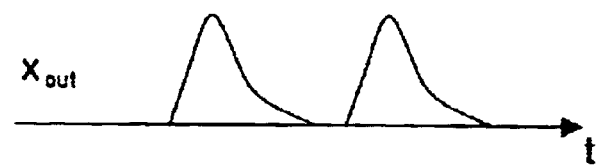
FIG. 9 is a graph showing waveforms of an input and a final output in a case where two digital inputs are applied to the microenergy device of FIG. 7 at a sufficiently short time interval.

However, if the two digital actuation signals are supplied thereto at a very short time interval therebetween, one large final output (actuation displacement) is obtained as shown in FIG. 9.

Therefore, the range of the final output of the microenergy device according to the present invention can be controlled by adjusting the time characteristics of the inputted digital signals.

According to the present invention, repeatability of microenergy with higher accuracy can be achieved, and the characteristics of the final output such as the range, velocity and force can be adjusted. Further, when the microenergy system including the signal generating unit is implemented, there is an advantage in that it can be implemented without a digital/analog converter.

Although the present invention has been described in connection with the preferred embodiments with reference to the accompanying drawings, the preferred embodiments are intended not to limit the invention but to exemplify a best mode of the present invention. It will be understood by those skilled in the art that various changes or modifications may be made thereto without departing from the spirit and scope of the invention. Therefore, the present invention is defined only by the appended claims which should be construed as covering such changes, modifications or adjustments.

What is claimed is:

1. A microenergy device for developing modulated microenergy in response to signals, comprising:
   a microenergy generating unit for generating the microenergy; and
   a micromechanical modulator for mechanically modulating the microenergy generated from the microenergy generating unit and finally developing the modulated microenergy,
   wherein the microenergy generating unit includes one or more unit digital microenergy generators constructed to selectively generate any one of two different levels of microenergy, which are always kept constant, in response to the digital input signal.

2. The microenergy device as claimed in claim 1, wherein the microenergy generated from the digital microenergy generators is represented by any one of force, displacement, velocity, momentum, pressure, flow rate, flow velocity, temperature, heat flux, heat flow and reaction energy.

3. The microenergy device as claimed in claim 1, wherein the unit digital microenergy generator use one of electrostatic, piezoelectric, electromagnetic, thermopneumatic, bimetallic and phase change phenomena depending on the kind of the generated microenergy.

4. The microenergy device as claimed in claim 1, wherein the micromechanical modulator modulates the microenergy by using any one of a micromechanical structure, a micromechanism, a microfluidic element, a microthermal element and a microchemical element depending on the kind of the microenergy supplied by the digital microenergy generators.

5. The microenergy device as claimed in claim 1, wherein the micromechanical modulation performed by the micromechanical modulator is one of switching, amplification, attenuation, filtering, digital-to-analog conversion, analog-to-digital conversion and rectification.

6. The microenergy device as claimed in claim 1, wherein the microenergy generating unit includes N digital microenergy generators; the micromechanical modulating unit includes 2N micromechanical modulators for modulating the digital microenergy generated from the respective N digital microenergy generators and obtaining the microenergy, and N output stations for outputting the microenergy obtained from the micromechanical modulating unit; one end of a first micromechanical modulator and one end of a second micromechanical modulator are connected to a first output station in parallel with the station; one end of an i-th micromechanical modulator is connected in series to (i−1)-th and (i−2)-th micromechanical modulators via an ((i−1)/2)-th output station, where i is assumed to be an odd number from 3 to 2N; the other end of the i-th micromechanical modulator and one end of the (i+1)-th micromechanical modulator are connected in parallel to ((i+1)/2)-th output station; the other end of the first micromechanical modulator is fixed; and the N unit digital microenergy devices are connected to the other end of (i−1)-th micromechanical modulator one by one so as to input the microenergy.

7. The microenergy device as claimed in claim 6, wherein the micromechanical modulator is constructed to sum up the microenergy obtained from the N output stations and to output the summed microenergy.

8. The microenergy device as claimed in claim 6, wherein a modulation rate of the i-th micromechanical modulator is equal to a combined value of modulation rates of the (i−1)-th and (i−2)-th micromechanical modulators, and a modulation rate of the (i+1)-th micromechanical modulator is equal to a combined value of modulation rates of the i-th micromechanical modulator and all micromechanical modulators connected in series to the i-th micromechanical modulator.

9. The microenergy device as claimed in claim 7, wherein a modulation rate of the i-th micromechanical modulator is equal to a combined value of modulation rates of the (i−1)-th and (i−2)-th micromechanical modulators, and a modulation rate of the (i+1)-th micromechanical modulator is equal to a combined value of modulation rates of the i-th micromechanical modulator and all micromechanical modulators connected in series to the i-th micromechanical modulator.

10. The microenergy device as claimed in claim 8, wherein the micromechanical modulators are springs, and the digital microenergy generators are constructed to be displaced between a first position and a second position in response to a value of the input signal and to apply deformation forces to the springs.

11. The microenergy device as claimed in claim 9, wherein the micromechanical modulators are springs, and the digital microenergy generators are constructed to be displaced between a first position and a second position in response to a value of the input signal and to apply deformation forces to the springs.

12. The microenergy device as claimed in claim 1, wherein the microenergy generating unit includes N unit digital microenergy generators; the micromechanical modulating unit includes N micromechanical modulators for modulating the microenergy from generated from the respective N digital microenergy generators and obtaining the microenergy, and one output station for outputting the microenergy obtained from the micromechanical modulators; the N digital microenergy generators are constructed to be connected to one ends of the N the micromechanical modulators one by one so as to input the microenergy; and the other ends of the N the micromechanical modulators are connected in parallel to the output station.

13. The microenergy device as claimed in claim 12, wherein the digital microenergy generators are constructed to output one of first pressure and second pressure in response to the digital input signal, and the micromechanical modulators are flow resistors constructed to reduce the pressure outputted from the digital microenergy generators and to provide the reduced pressure to the output station.

14. The microenergy device as claimed in claim 13, wherein each of the micromechanical modulators is a flow resistor having any one pressure reduction rate of pressure reduction rates which increase by multiples of two.

15. The microenergy device as claimed in claim 13, wherein the flow resistor is formed of one or more flow passages having an identical passage radius.

16. The microenergy device as claimed in claim 14, wherein the flow resistor is formed of one or more flow passages having an identical passage radius.

17. The microenergy device as claimed in claim 1, wherein the digital microenergy generators is one displacement body constructed to be displaced between a first position and a second position in response to a value of the input signal; and the micromechanical modulator comprises one spring with one end connected to the displacement body, and one mass connected to the other end of the spring.

18. The microenergy device as claimed in claim 1, wherein some or all of the digital microenergy generators or the micromechanical modulators are designed to have detailed structures or dimensions so that the microenergy can be generated or modulated according to a ratio of dimensions or physical properties instead of absolute magnitude of relevant dimensions or physical properties in order to cancel variation in a final output due to identical errors in fabricating processes or physical properties.

* * * * *